(12) United States Patent
Wiker et al.

(10) Patent No.: US 7,365,469 B2
(45) Date of Patent: Apr. 29, 2008

(54) LAMINATED ARMATURE CORE FOR AN ELECTRIC MOTOR

(75) Inventors: Juergen Wiker, Leinfelden-Echterdingen (DE); Joachim Schadow, Dettenhausen (DE); Mario Frank, Hangzhou (TJ)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 10/552,223

(22) PCT Filed: Sep. 9, 2004

(86) PCT No.: PCT/EP2004/052107

§ 371 (c)(1),
(2), (4) Date: Oct. 6, 2005

(87) PCT Pub. No.: WO2005/027310

PCT Pub. Date: Mar. 24, 2005

(65) Prior Publication Data

US 2006/0214531 A1    Sep. 28, 2006

(51) Int. Cl.
*H02K 1/00* (2006.01)

(52) U.S. Cl. ....................... 310/216; 310/217
(58) Field of Classification Search ......... 310/214–218
See application file for complete search history.

(56) References Cited

U.S. PATENT DOCUMENTS

| 3,469,136 | A | | 9/1969 | Jenkinson |
| 4,893,042 | A | | 1/1990 | Tanaka |
| 4,896,066 | A | * | 1/1990 | Tomite ............ 310/214 |
| 5,705,874 | A | * | 1/1998 | Grudl ............ 310/216 |
| 6,242,835 | B1 | | 6/2001 | Uemura et al. |
| 2003/0030333 | A1 | | 2/2003 | Johnsen |

FOREIGN PATENT DOCUMENTS

| EP | 0 275 320 A1 | 7/1988 |
| FR | 676 699 | 2/1930 |
| FR | 2 494 926 | 5/1982 |
| JP | 53079202 | 7/1978 |
| JP | 55157949 | 12/1980 |
| JP | 58049053 | 3/1983 |
| JP | 04026344 A2 | 1/1992 |
| SU | 729761 | 4/1980 |
| SU | 951574 | 8/1982 |

* cited by examiner

*Primary Examiner*—Thanh Lam
(74) *Attorney, Agent, or Firm*—Michael J. Striker

(57) ABSTRACT

In an armature packet (1) for an electric motor, having a plurality of armature laminations (2, 3), in each of which a plurality of winding slots (4) for receiving an armature winding (5) are embodied, and the winding slots (4) of adjacent armature laminations (2, 3) are located in alignment with one another and form a conduit (6), a better positional fixation of the armature winding (5) is attained by providing that the winding slots (4), associated with one conduit (6), of different armature laminations (2, 3) have different geometries. The same is attained by providing that at least some of the winding slots (4) each have an influx conduit (11), each of which discharges into its region oriented toward the center of the armature packet (1).

5 Claims, 5 Drawing Sheets

LAMINATED ARMATURE CORE FOR AN ELECTRIC MOTOR

BACKGROUND OF THE INVENTION

The invention is based on an armature packet for an electric motor.

For producing armature packets for electric motors, individual armature laminations are stamped in such a way that recesses for armature windings are stamped into the lamination in the same operation. The armature windings are wound into these winding slots and fixed in their position by impregnation with a suitable material. In principle, there are two known methods for this.

In dip roller-burnishing, the wound armature packet is sealed by being dipped and rolled in the impregnating material (such as polyester resin). Next, the impregnating material is hardened, so that the winding together with the armature packet forms a rigid structure. In the drip process, a variant of dip roller-burnishing, the armature packet is received, rotating, in a suitable device and the impregnating material is dripped onto it. Next, the impregnating material is hardened as in dip roller-burnishing. However, in dip roller-burnishing and the drip process, the problem is that the impregnating material does not always penetrate all the voids between the armature windings. To assure that these voids will be completely filled, all the process parameters, such as temperature, viscosity, winding density of the wires, and venting, must be optimally adapted to one another and adhered to as exactly as possible. Otherwise, uneven filling of the winding slots with impregnating material and air inclusions, which thus leads to the formation of bubbles. As a result, the windings are fixed only inadequately in their position against the centrifugal forces that occur in operation and against vibration. As a consequence, short-circuited coils occur along with vibration from radial shifting of the armature winding and hence of the center of mass, resulting in a shorter service life of the motor.

In armoring, for additional fixation, so-called cross bandages of paper or plastic cords are used. These bandages on the one hand provide a certain protection of the windings from abrasive grinding powders and on the other provide an additional positional fixation of the windings in the packet. As a result, while the defects of impregnation are essentially compensated for, nevertheless this method is very complicated and thus expensive in the production process, and so it is employed only for high-quality motors.

SUMMARY OF THE INVENTION

An armature packet for an electric motor according to the invention has the advantage over the prior art that by means of the winding slots of different armature laminations, which winding slots are associated with one conduit and have different geometries from one another, the armature windings are better fixed in their position. As a result, there are also fewer short-circuited coils, which are otherwise caused by friction among loose winding wires. Likewise, a lessening of vibration is attained, since the armature winding, after the impregnating material has hardened, can no longer shift radially even at high rpm and hence strong centrifugal forces, so that no change in the center of mass occurs. The same is also true of an armature packet for an electric motor according to the invention as defined by the characteristics of claim 4, since because of the influx conduits, the impregnating material reaches even the lower windings well.

Because the geometry of every other winding slot of one conduit has a larger cross section than the winding slot of the adjacent armature lamination, the impregnating material can penetrate deep, down to the bottom of the winding slot, so that by capillary action it reaches the innermost winding wires and fixes them against any kind of motion once it has hardened. Besides the possibility of providing every other winding slot with a larger cross section, it is equally possible to provide any other sequence in the conduit.

Because the geometry of every other winding slot has a larger cross section than the adjacent winding slots of the same armature lamination, armature laminations that are made with the same stamping tool are produced by rotation relative to one another, each about an adjacent winding slot, to form a regular pattern of winding slots of small cross section and winding slots of large cross section over the entire armature packet. Besides the possibility of providing every other winding slot with a larger cross section, it is equally possible to provide any other sequence.

Because the influx conduit of all the winding slots associated with one conduit communicate with one another through at least one transverse conduit, oriented substantially parallel to the central longitudinal axis of the armature packet, the impregnating material reaches all the influx conduits very well and thus reaches the winding wires located very deep in the individual winding slots. Besides the typical case of one transverse conduit, it is equally possible to provide an arbitrary number of transverse conduits. The geometry of the transverse conduit may be round, oval, rectangular, or arbitrarily shaped.

Because the transverse conduit is located between the winding slot and the central longitudinal axis of the armature packet, the magnetic flux is affected least, since the transverse conduit is located quite close to the center of the armature packet.

Because the influx conduits are each embodied as at least one stamping in the respective armature lamination, which include the transverse conduit, very simple, economical production is provided for the individual armature laminations, which are then joined together to form the armature packet. Besides the normal case of one stamping, two or more stampings are also possible. This is particularly true in the case of an oval or rectangular transverse conduit.

Because the sequence of one purely transverse conduit, one influx conduit leading away to the right from the transverse conduit, and one influx conduit leading away to the left from the transverse conduit in a given conduit is repeated again and again, there is a simple, secure way of feeding the impregnating material to the winding wires located deep at the bottom in the winding slots. Moreover, it is also possible to provide influx conduits that extend vertically upward. The sequence of the influx conduits and of the transverse conduit can have any arbitrary order.

Because the cross section of each winding slot has a constriction on the outer end, in particular with two undercuts, good introduction of the winding wires located in the winding slots and protection of them against mechanical wear from outside are assured.

BRIEF DESCRIPTION OF THE DRAWINGS

One exemplary embodiment of the invention is described in the ensuing description in conjunction with the drawings.

The drawings show.

DETAILED DESCRIPTION OF THE PREFERRED EMBODIMENTS

Figure 1:
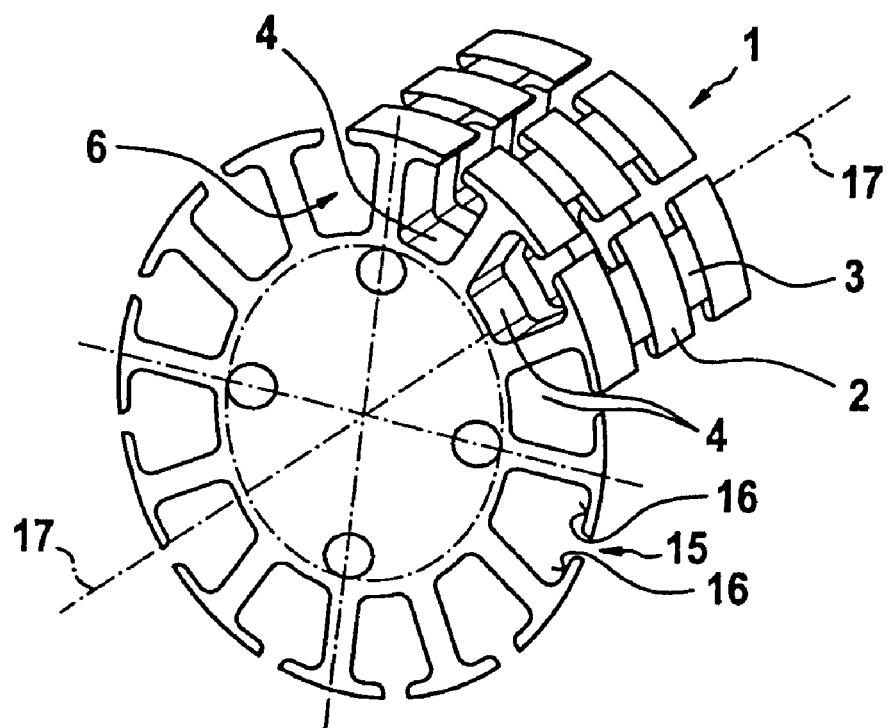
FIG. 1, an isometric view of a first exemplary embodiment of an armature packet of the invention.
Figure 2:
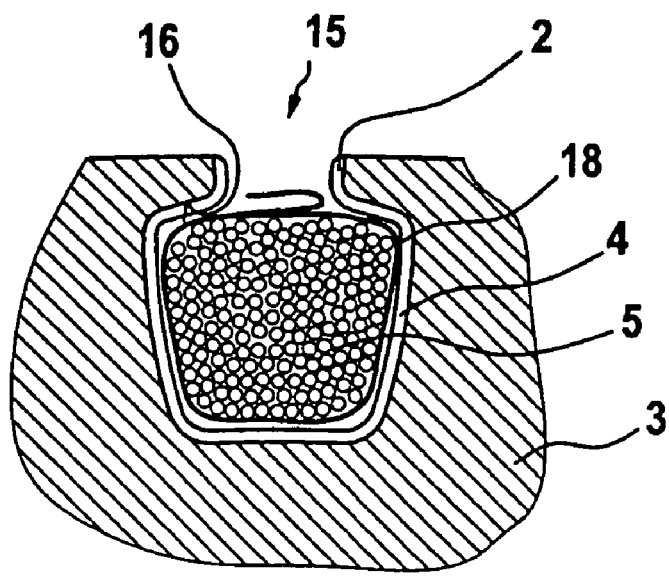
FIG. 2, a sectional view of an individual winding slot of the armature packet of FIG. 1, on a larger scale.
Figure 3:
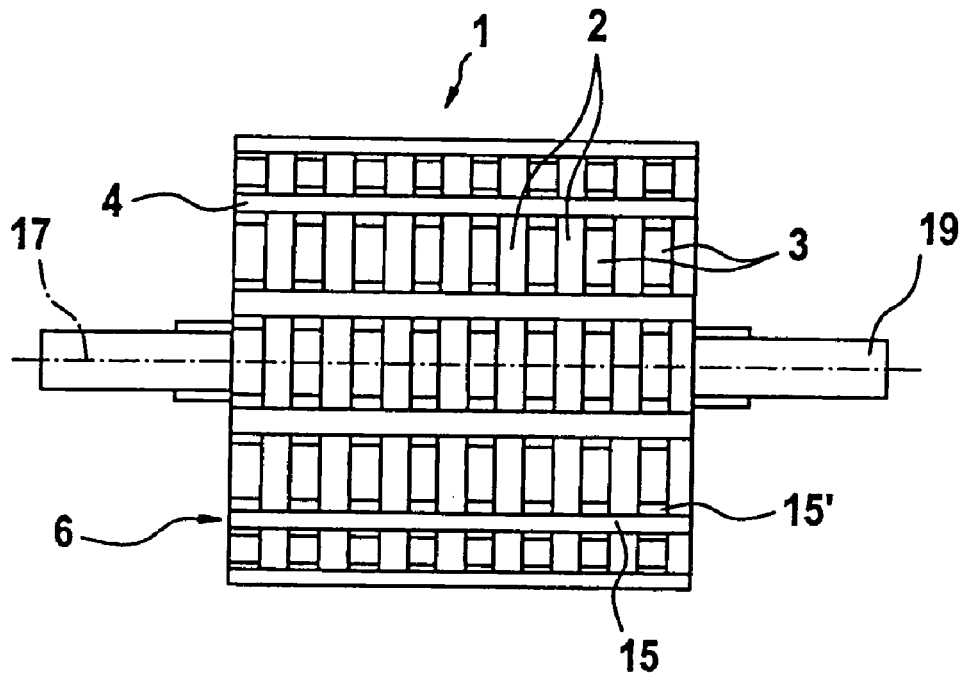
FIG. 3, the side view of the armature packet of FIG. 1.

In FIGS. 1 through 3, a first exemplary embodiment of an armature packet 1 of the invention is shown. In FIG. 1, the armature packet 1 is shown without its armature winding 5 (see FIG. 2). The same is also true for FIG. 3. The armature packet 1 has a plurality of armature laminations 2, 3, lined up with one another along a central longitudinal axis 17. The armature laminations 2, 3 have winding slots 4 along their circumference. In the case shown, there are a total of twelve winding slots 4, which are each located equidistant from one another. The winding slots 4 are embodied such that on the circumference of the respective armature lamination 2, 3 they have a constriction 15, which widens via two undercuts 16 into a larger cross section. The twelve winding slots 4 are merely an example; any other number of winding slots 4 may also be embodied in the armature laminations 2, 3. The winding slots 4 need not be equidistant from one another, either.

The winding slots 4 of the individual armature laminations 2, 3 in line with one another are oriented such that in each case one conduit 6 oriented toward the central longitudinal axis 17 is formed. The armature winding 5 (see FIG. 2) is drawn into this conduit 6.

The winding slots 4 of two adjacent armature laminations 2, 3 are designed differently in terms of their cross section. The first armature lamination 2 shown in FIG. 1 has winding slots 4 of smaller cross section than the second armature lamination 3.

In FIG. 2, a section through a second armature lamination 3 is shown, perpendicular to the central longitudinal axis 17. It is readily seen here that the cross section of the winding slot 4 of the second armature lamination 3 is larger than that of the armature lamination 2, which in this view protrudes past the outline of the winding slot 4 of the second armature lamination 3. Thus for the winding slot 4 of the second armature lamination 3, there is both a wider constriction 15' and undercuts 16 that extend farther into the armature lamination 3. Moreover, the entire winding slot 4 of the second armature lamination 3 is wider and deeper than the winding slot 4 of the first armature lamination 2.

The armature winding 5 has been introduced into the conduit 6 in a known manner in an insulation paper 18. It is limited in its circumference by the winding slot 4, having the smaller cross section, of the first armature lamination 2. As a result, there is a void, completely surrounding the armature winding 5, in the winding slot 4 of the second armature lamination 3. Upon the impregnation of the armature packet 1 with an impregnating material by the known methods, the impregnating material can penetrate deeply, down to the bottom of the winding slot 4 of the second armature laminations 3. By capillary action, the impregnating material thus reaches as far as the innermost winding wires and fixes them, after hardening, against any kind of motion. This means that the winding wires in the winding slots 4 can no longer move, and thus no short-circuited coils occur. Moreover, no vibration from radial shifting of the armature winding 5 occurs, and hence also no shifting of the center of mass. This means that the service life of the motor in which the armature packet 1 is built in is lengthened, compared to the armature packets known from the prior art.

In FIG. 3, a side view of the armature packet 1 described above is shown, which is located on an armature shaft 19. The surface pattern of the armature packet 1 here can be seen, resulting from the various constrictions 15 in the individual armature laminations 2, 3. For greater clarity, the armature windings 5 are not shown. The narrow constrictions 15 of the first armature lamination 2 extend as far as the narrow solid lines, which extend continuously, parallel to the central longitudinal axis 17.

Figure 4:
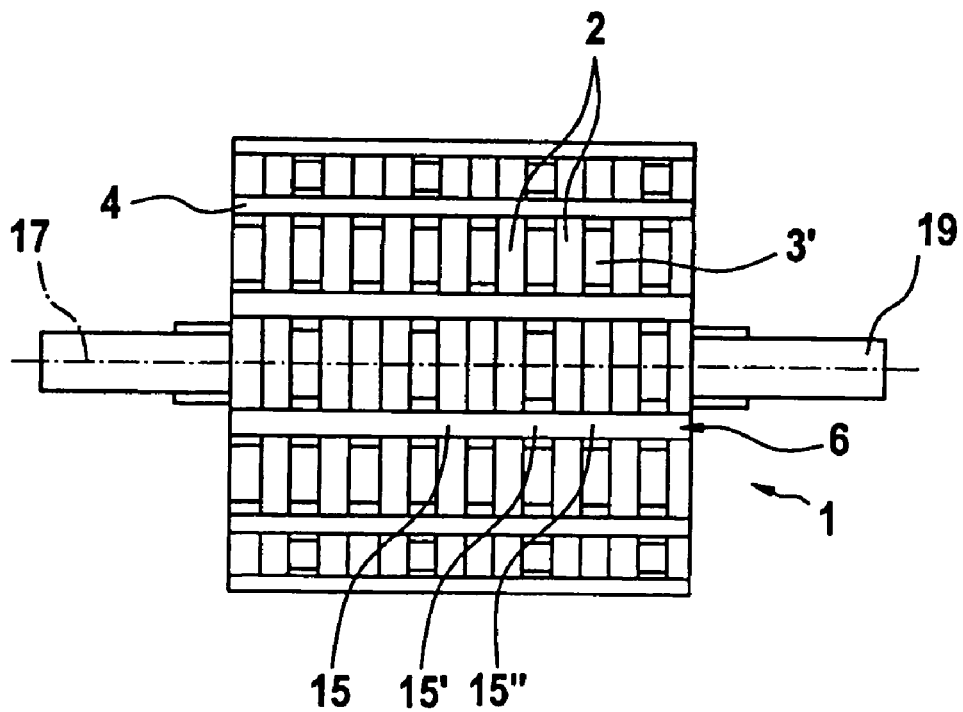
FIG. 4, a second exemplary embodiment of the invention in a side view as in FIG. 3, but with a different geometry of the individual armature laminations.

In FIG. 4, a different surface pattern is shown, resulting from a different combination of armature laminations 2, 3, 3' in the form of a second exemplary embodiment. The first armature laminations 2 and the second armature laminations 3 are designed identically to those of the first exemplary embodiment (FIGS. 1 through 3). However, third armature laminations 3' are also included. These have an enlarged cross section only for every other winding slot 4. The remaining winding slots of the third armature lamination 3' have the same size as the winding slots 4 of the first armature lamination 2.

The order of the armature laminations 2, 3, 3' is such that in alternation, a second armature lamination 3 and then a third armature lamination 3' are located between two first armature laminations 2. The result, always in the same sequence, is different-sized constrictions 15, 15', 15", specifically successively a narrow constriction 15, a wide constriction 15', a narrow constriction 15, and a medium-wide constriction 15". After that, the entire sequence is repeated.

Once again, the same advantages are attained by the voids that act as capillaries, so that complete fixation of the winding wires is attained.

Figure 5:
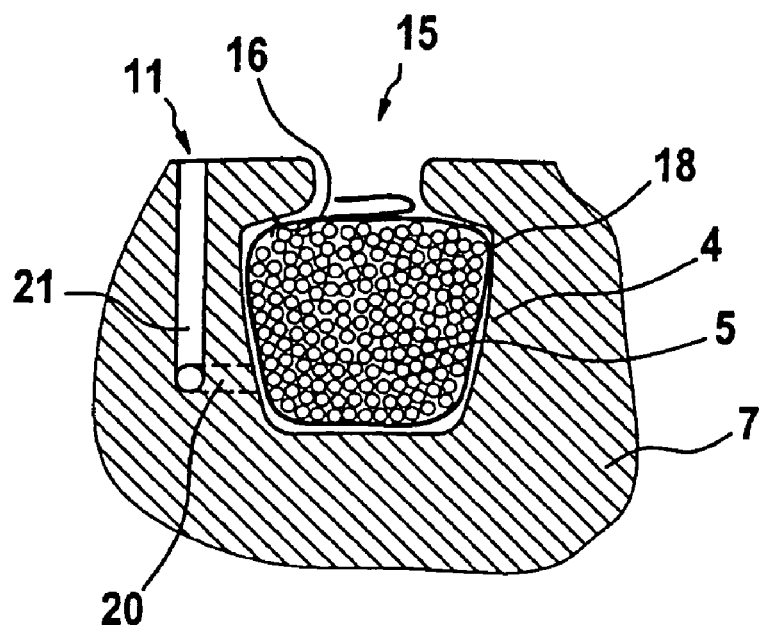
FIG. 5, a detail of a winding slot of FIG. 2 of an armature lamination of a third exemplary embodiment of the invention, with an influx conduit and a radial stamped out recess.

In FIG. 5, a third exemplary embodiment of the invention is shown. In this exemplary embodiment, unlike the two exemplary embodiments described above, the slot 4 is embodied identically in all the armature laminations 7, in the manner known from the prior art. First, however, it must be remembered that in addition to the characteristics described below, an embodiment of the winding slots 4 in accordance with one of the two exemplary embodiments described above (shown in FIGS. 1 through 4) is entirely possible.

An armature winding 5 is introduced into the winding slot 4, in an insulation paper 18. A vertical part 21 of an influx conduit 11 is stamped into the armature lamination 7 from the surface of the armature lamination 7. In the further armature lamination behind it (concealed by the armature lamination 7 shown), conversely, a horizontal part 20 of the influx conduit 11 is stamped. The horizontal part 20 of the influx conduit 11 discharges into the winding slot 4 on its lower end, oriented toward the center point of the armature packet 1. This alternating arrangement of armature laminations 7 with a vertical part 21 and a horizontal part 20 is repeated over the entire length of the armature packet 1. However, it is equally possible to replace some of the armature laminations 7 with a vertical part 21 or horizontal part 20 with an armature lamination (not shown) that has only a bore in the region where the vertical part 21 meets the horizontal part 20. As a result of the arrangement shown in FIG. 5, in the region where the vertical part 21 intersects the horizontal part 20 of the influx conduit 11, a continuous bore in the direction of the central longitudinal axis 17 (not shown) is created. As a result, in the impregnation, it is possible for the impregnating material to reach well into the lower region of the armature winding 5.

In dip roller-burnishing, the embodiment shown has the effect that the impregnating material is well fed by the additional influx conduits 11 to the winding wires located deep at the bottom.

In FIGS. 6 and 6a-c, a fourth exemplary embodiment is shown, which is similar in construction to the third exemplary embodiment shown in FIG. 5. Once again, the armature laminations 8, 9, 10 located in line with one another are designed such that their winding slots 4 all have the same cross section. However, once again it is true that in addition to the characteristics described below, an embodiment in accordance with one of the first two exemplary embodiments, shown in FIGS. 1 through 4, can also be made.

Figure 6:
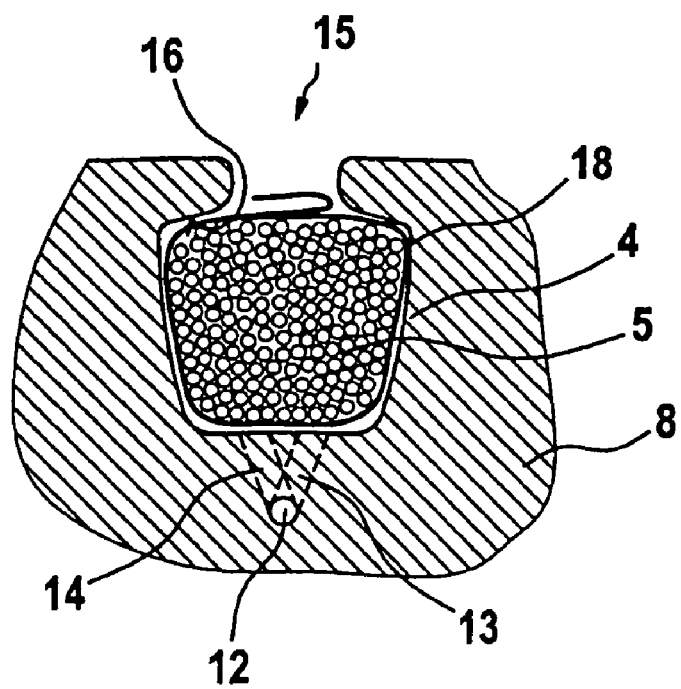
FIG. 6, a detail of a winding slot of FIGS. 2 and 5 of a fourth exemplary embodiment of the invention, with a longitudinally extending transverse conduit and with stamped-out recesses for the individual armature laminations.
Figure 6A:
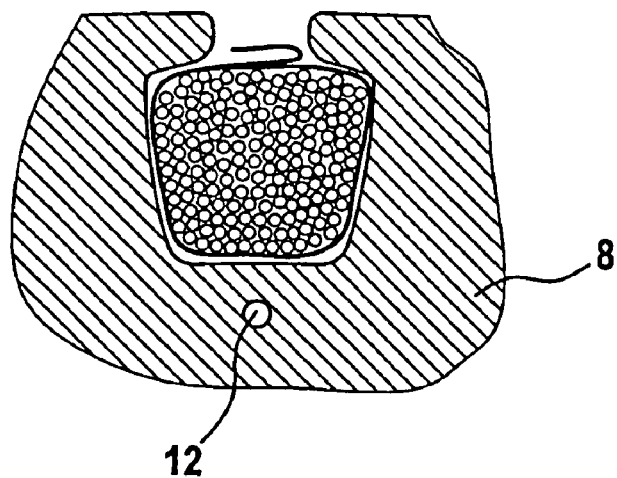
FIGS. 6*a-c,* three armature laminations located one after the other, in the exemplary embodiment shown in FIG. 6.
Figure 6B:
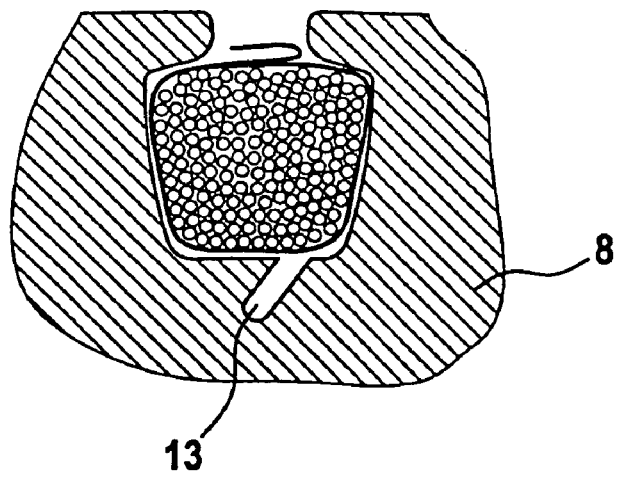
Figure 6C:
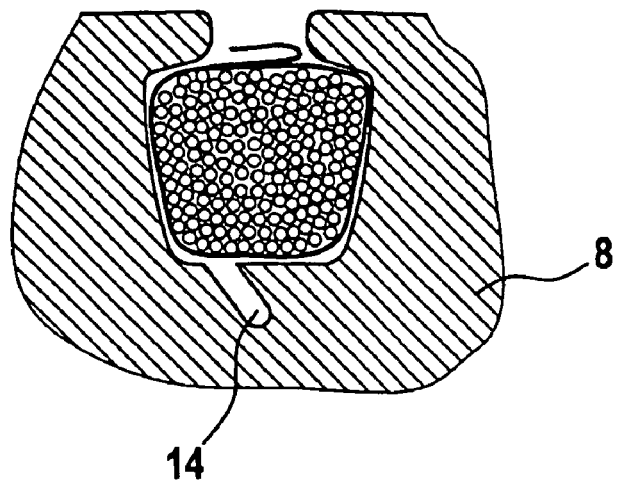

In contrast to the third exemplary embodiment, the influx conduit 11, which in the third exemplary embodiment has an opening in the surface of the armature lamination 7, is replaced in the form of a transverse conduit 12, which extends essentially parallel to the central longitudinal axis 17 (not shown). In the front armature lamination 8 shown in FIG. 6a, only the transverse conduit 12 is present below the winding slot 4. The middle armature lamination 9 located behind it has an oblique stamped out recess 13 on the right, which communicates with the lower end of the winding slot 4. The rear armature lamination 10, adjoining the middle armature lamination 9, has a left stamped out recess 14, embodied mirror-symmetrically to the right stamped out recess 13. The left stamped out recess 14 also communicates with the lower part of the winding slot 4. When the three armature laminations 8, 9, 10 of FIGS. 6a-c are located one behind the other, the result in the region of the transverse conduit 12 is a continuous conduit that extends over the entire length of the armature packet 1. The arrangement of the three armature laminations 8, 9, 10 shown is repeated periodically. As a result, after each three armature laminations 8, 9, 10, the same order occurs again. It should be remembered, however, that any other sequence of the three armature laminations 8, 9, 10 is also possible. It need not repeat periodically once; the user is free to select the lineup behind one another in whatever way is most favorable for that user's application.

By means of such an embodiment, the same advantages are attained in dip roller-burnishing as is the case with the third exemplary embodiment shown in FIG. 5. Here as well, the impregnating material passes through the transverse conduit 12 and the right stamped-out recesses 13 and left stamped-out recesses 14 communicating with it to reach the lower part of the winding slots 4 and thus the deep winding wires. Moreover, an embodiment in accordance with the fourth exemplary embodiment also has the decisive advantage in the drip process that improved venting takes place, and hence the formation of bubbles is greatly reduced. Moreover, such a subject has the advantage that the transverse conduit 12, the right stamped out recess 13 and the left stamped out recess 14 are located quite close to the center of the armature lamination and thus affect the magnetic flux only slightly.

Figure 7:
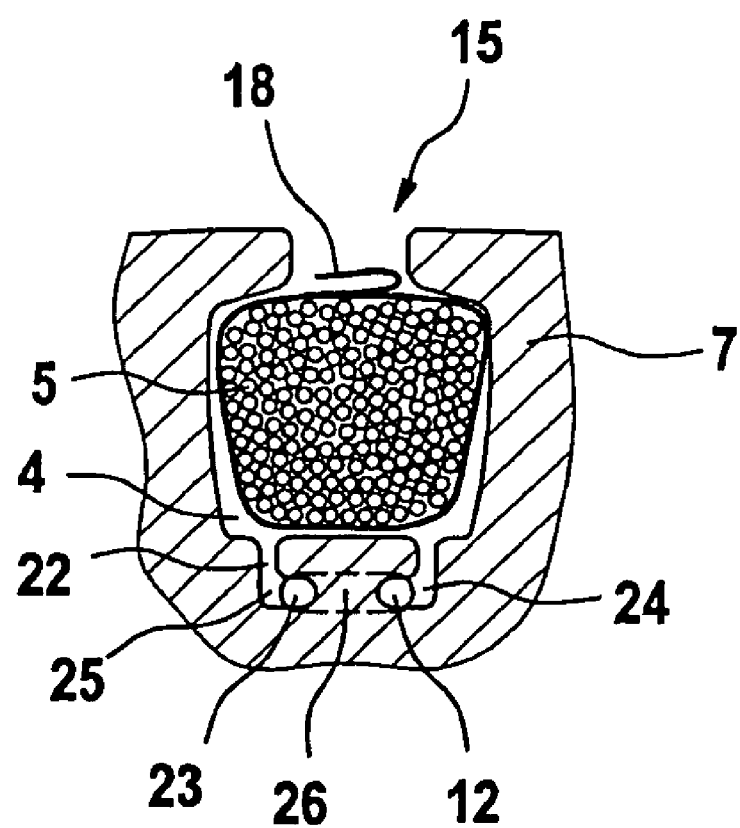
FIG. 7, a detail of a winding slot of FIGS. 2, 5 and 6 of a fifth exemplary embodiment of the invention, with two longitudinally extending transverse conduits.

In FIG. 7, a fifth exemplary embodiment is shown, which is constructed similarly to the fourth exemplary embodiment shown in FIGS. 6 and 6a-c. Once again, the armature laminations 7 in line with one another are designed such that their winding slots 4 all have the same cross section. However, here as well it is true that in addition to the characteristics described below, an embodiment in accordance with one of the first two exemplary embodiments, which are shown in FIGS. 1 through 4, can be made.

In contrast to the fourth exemplary embodiment, the transverse conduit 12 is not circular but instead is embodied as an oval stamped out recess 23. The armature packet 1 in the fifth exemplary embodiment has armature laminations 7 which have L-shaped stampings 24 that begin at the winding slot 4. The L-shaped stampings 24 have both a vertical part 22 and a horizontal part 25. The two vertical parts 22 are joined to the winding slot 4 at the sides of the lower region of the winding slot. The two horizontal parts 25 are oriented toward one another. As a result, a web 26 remains between the two L-shaped stampings 24. This web 26 is embodied as slenderer in the region of the horizontal parts 25 than in the region of the vertical parts 22.

In the armature lamination that is concealed behind the armature lamination 7 shown, an oval stamping 23, shown in dashed lines, which has no communication with the winding slot 4 is embodied. The oval stamping 23 is located such that it concludes at least partly in alignment with the horizontal parts 25 of the L-shaped stamping 24. As a result, two transverse conduits 12 oriented parallel with the central longitudinal axis (not shown) of the armature packet 1 are embodied.

The possibility exists of locating the two embodiments of the armature lamination 7, as described above, in alternating order. Moreover, the two types of armature laminations 7 may also be arranged in an arbitrary order with repetitions of the one type of armature laminations 7 and the other type. It is furthermore equally possible to install armature laminations 8, 9, 10 of the fourth exemplary embodiment shown in FIGS. 6a-c in the armature packet 1. It must merely be assured that a continuous transverse conduit 12 through all the armature laminations 7, 8, 9, 10 is created. This transverse conduit 12 need not necessarily extend parallel to the central longitudinal axis 17 of the armature packet 1.

In summary, it can be said that an improved positional fixation of the armature winding 5 in the winding slots 4 is attained by all five exemplary embodiments of the invention. Mixing the characteristics shown in the five exemplary embodiments described can be done without problems. By combining the various types of armature laminations of the five exemplary embodiments shown—both with an influx conduit 11 and transverse conduit 12 or without these additional means—a virtually unlimited variety of armature packets 1 can be obtained. As a result, very individualized adaptation to the requirements in the production process of the particular armature packet 1 is achieved. This quite infinite variety of design options has all the advantages recited above.

The invention claimed is:

1. An armature packet (1) for an electric motor, comprising:
a plurality of armature laminations (2, 3, 3'), wherein in each of said armature laminations (2, 3, 3'), a plurality of winding slots (4) for receiving an armature winding (5) is provided, wherein the winding slots (4) of adjacent armature laminations (2, 3, 3') are located in alignment with one another and form a conduit (6), wherein the winding slots (4), associated with one conduit (6), of different armature laminations (2, 3, 3') have different geometries, wherein each winding slot (4) has two undercuts (16), and wherein the winding slots (4) of a first armature lamination (2) of two adjacent laminations (2, 3, 3') has a smaller cross section and a smaller constriction (15) than a second armature lamination (3) of said two adjacent laminations (2, 3, 3').

2. The armature packet (1) according to claim 1, wherein the geometry of every other winding slot (4) of one conduit (6) has a larger cross section than the winding slot (4) of the adjacent armature lamination (2, 3, 3').

3. The armature packet (1) according to claim 1, wherein the geometry of every other winding slot (4) has a larger cross section than the adjacent winding slots (4) of the same armature lamination (2, 3, 3').

4. The armature packet (1) according to claim 3, wherein it is embodied according to one of claims 1 through 3.

5. The armature packet (1) according to claim 1, wherein the cross section of each winding slot (4) has a constriction (15, 15', 15") on the outer end, in particular with two undercuts (16).

* * * * *